United States Patent [19]

Bar-Joseph et al.

[11] Patent Number: 5,008,717
[45] Date of Patent: Apr. 16, 1991

[54] SEMICONDUCTOR DEVICE INCLUDING CASCADED MODULATION-DOPED QUANTUM WELL HETEROSTRUCTURES

[75] Inventors: Israel Bar-Joseph, Highlands; Tao-Yuan Chang, Lincroft; Daniel S. Chemla, Rumson, all of N.J.

[73] Assignee: AT&T Bell Laboratories, Murray Hill, N.J.

[21] Appl. No.: 322,958

[22] Filed: Mar. 3, 1989

[51] Int. Cl.[5] .................. H01L 29/205; H01L 29/68
[52] U.S. Cl. ......................................... 357/16; 357/4; 357/22; 357/30; 350/354; 350/355; 372/43; 372/45; 330/4.3
[58] Field of Search ............... 332/7.51; 350/355, 354; 357/16, 4, 22, 30; 372/43, 45

[56] References Cited

U.S. PATENT DOCUMENTS

| | | | |
|---|---|---|---|
| 4,700,353 | 10/1987 | Van Gieson et al. | 372/45 |
| 4,818,079 | 4/1989 | Maserjian | 350/354 |
| 4,826,295 | 5/1989 | Burt | 350/355 |
| 4,873,555 | 10/1989 | Coon et al. | 357/30 |

OTHER PUBLICATIONS

D. S. Chemla et al., IEEE J. of Quantum Elec., vol. 24, No. 8, Aug. 1988, "Modulation of Absorption in Field-Effect . . . ", pp. 1664–1676.
J. M. Iannelli et al., Appl. Phys. Lett., 54 (4), Jan. 23, 1989, "Optically Controlled Absorption Modulator Based on State . . . ", pp. 301–303.
W. Kopp et al., IEEE Elec. Dev. Lett., vol. EDL-3, No. 5, May 1982, "A New $Al_{0.3}Ga_{0.7}As/GaAs$ Modulation-Doped FET", pp. 109–111.
T. J. Drummond et al., Proc. of the IEEE, vol. 74, No. 6, Jun. 1896, "Modulation-Doped GaAs/(Al,Ga)As . . . ", pp. 773–822.
T. J. Drummond et al., IEEE Spectrum, Jun. 1988, "Quantum-Tailored Solid-State Devices", pp. 33–37.

Primary Examiner—Jerome Jackson, Jr.
Attorney, Agent, or Firm—Gregory C. Ranieri

[57] ABSTRACT

Modulation-doped quantum well heterostructures are cascaded in a semiconductor device to achieve high speed operation while obtaining large index of refraction or absorption coefficient changes for modulating lightwave signals without significant increases in the operating potentials over prior quantum well structures. Each modulation-doped quantum well heterostructure exhibits substantially equal boundary conditions in an unbiased condition for efficient cascading or stacking. Each quantum well has associated with it a barrier layer to minimize leakage current. As a result, each quantum well has associated with it a separate charge reservoir. This aspect contributes to the speed of the cascaded structure. When incorporated within a waveguide structure, cascaded modulation-doped quantum well heterostructures can act as an external modulator, or as an intra-cavity wavelength tuning element, or as an intra-cavity modulator, or even as an optically-pumped laser.

9 Claims, 5 Drawing Sheets

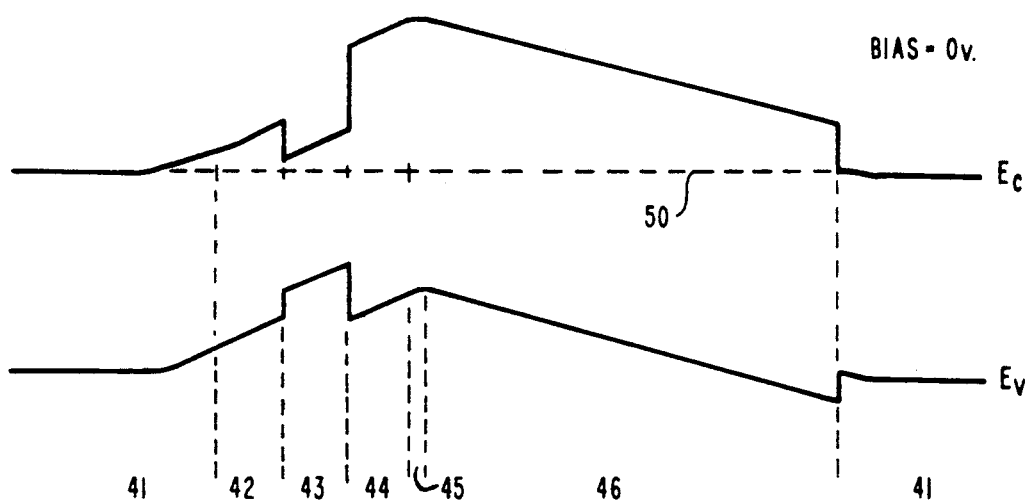
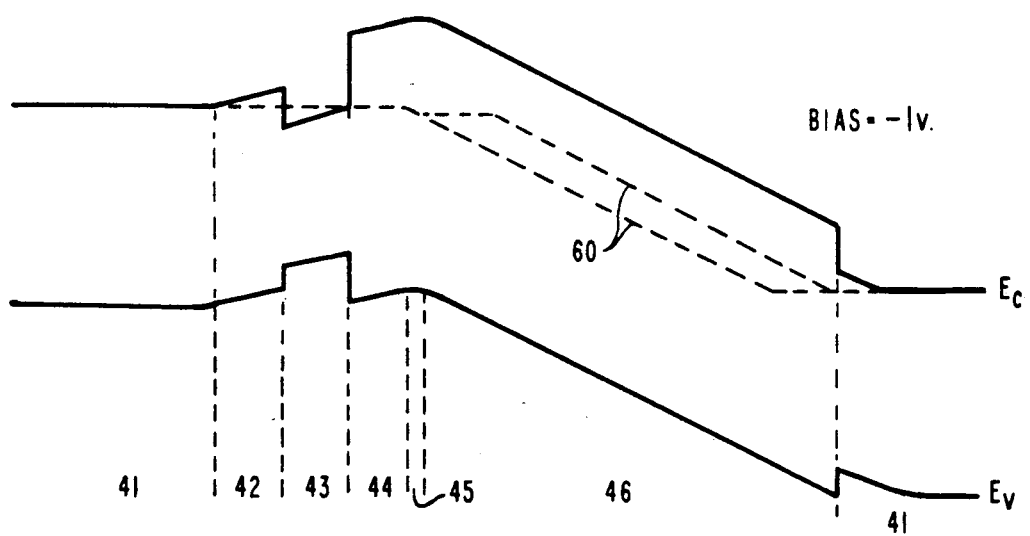

SEMICONDUCTOR DEVICE INCLUDING CASCADED MODULATION-DOPED QUANTUM WELL HETEROSTRUCTURES

TECHNICAL FIELD

This invention relates to semiconductor devices and, more particularly, to semiconductor devices including a modulation-doped quantum well heterostructures.

BACKGROUND OF THE INVENTION

Optical processing applications in lightwave communications, optical computing and photonic switching are creating a need for high speed, high performance optical and photonic devices such as modulators and the like. While modulation-doped quantum well structures have been developed for such applications, the structures require have relatively high capacitance which limits the speed of operation of the device. Moreover, higher voltages are required to deplete the quantum wells which, if more than one is included in the structure, are depleted sequentially from top to bottom.

SUMMARY OF THE INVENTION

Modulation-doped quantum well heterostructures are cascaded in a semiconductor device to achieve high speed operation while obtaining large optical effects such as index of refraction or absorption coefficient changes for modulating lightwave signals without significant increases in the operating potentials over prior quantum well structures. Each modulation-doped quantum well heterostructure exhibits substantially equal boundary conditions with respect to each end of the heterostructure in an unbiased condition for efficient cascading or stacking. Each quantum well has associated with it a barrier layer to minimize leakage current. As a result, each quantum well has associated with it a separate charge reservoir. This aspect contributes to the speed of the cascaded heterostructure.

In contrast to former quantum well devices, the cascaded modulation-doped quantum well heterostructures are substantially simultaneously depleted in the presence of a bias potential which tends to reduce the overall switching potentials.

When incorporated within a waveguide structure, cascaded modulation-doped quantum well heterostructures can be used as a waveguide element such as an external modulator for a light source, or as an intracavity wavelength tuning element coupled to a gain medium to produce a tunable laser, or as an intra-cavity modulator for directly modulated light source, or even as an optically-pumped laser. Due to relatively large electrically induced changes in optical characteristics, it is possible to fabricate shorter waveguide structures than multiple quantum well structures to produce the same change in optical characteristics.

In a vertical light propagation structure, the cascaded modulation-doped quantum well heterostructures can produce a sufficiently large phase-space absorption quenching (PAQ) effect that the structure can be used for optical reading, optical modulation, optical gating and has applicability to optical interconnects, optical switching, and optical computing.

BRIEF DESCRIPTION OF THE DRAWING

The present invention, together with its features and advantages, may be more readily understood from the following detailed description taken in conjunction with the accompanying drawing of several illustrative embodiments, in which:

FIGS. 5–8 are energy band profiles of a single modulation-doped quantum well heterostructure under varying bias potential conditions in accordance with the principles of the invention.

DETAILED DESCRIPTION

The various exemplary embodiments of the invention shown in the FIGS. have not been drawn to scale and are merely for purposes of illustration and not limitation. Exemplary dimensions of the semiconductor layers shown in the FIGS. are stated hereinbelow.

The present invention offers many interesting alternatives for device structures which may be included in opto-electronic integrated circuits. While many different device structures are possible, the description below focuses primarily on a waveguide structure having a waveguiding region surrounded at least on top and bottom surfaces by appropriate cladding regions. Modulation-doped quantum well heterostructures are cascaded in accordance with the principles of the invention to realize the waveguiding region of the devices shown in the FIGS. It should be noted that the structures presented in the FIGS. are merely for purposes of illustration and not for purposes of limitation.

Figure 1:
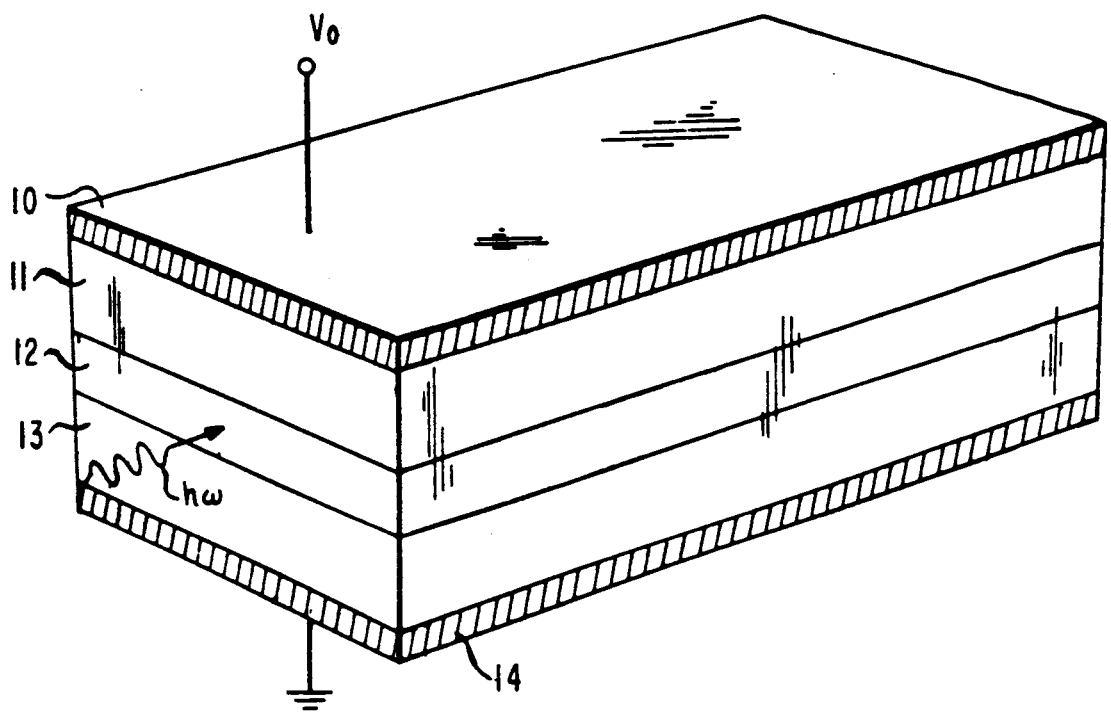
FIG. 1 is a perspective view of a waveguide device incorporating cascaded modulation-doped quantum well heterostructures in the waveguiding layer.

FIG. 1 shows a perspective view of a semiconductor waveguide device having a waveguiding region 12 surrounded at least on top and bottom surfaces by cladding regions 11 and 13, respectively. Electrical contact for biasing at potential $V_0$ is made to electrodes 10 and 14. The electrodes, as shown, contact the semiconductor waveguide device via the cladding regions. Light having a mean photon energy $\hbar\omega$ impinges on the device in a direction parallel to the longitudinal axis of the waveguide region.

The details of the various semiconductor layers which comprise the semiconductor waveguide device of FIG. 1 will be discussed in more detail below, particularly, with respect to FIGS. 4–8. That present lack of knowledge notwithstanding, it can be appreciated that a variation of the applied bias potential results in a corresponding change of the absorption coefficient or index of refraction. As a result, the semiconductor waveguide device may be switched rapidly between highly absorbing and highly transmissive states for amplitude or intensity modulation. This is particularly useful when the mean photon energy of the light $\hbar\omega$ in the waveguide is greater than the energy of the absorption band edge for a modulation-doped quantum well heterostructure. Similarly, the index of refraction for the semiconductor waveguide device may be varied to increase or decrease the effective optical path length of the waveguide. Generally, index variations are employed for frequency or phase modulation applications. This is particularly useful when the means photon energy of the light $h\omega$ in the waveguide is below the energy of the absorption band edge for each modulation-doped quantum well heterostructure.

In view of the brief description provided above, it should be clear to those skilled in the art that semiconductor device realized in accordance with the principles of the present invention is suitable for incorporation within a waveguide structure as a waveguide element such as an external modulator for a light source, or as an intra-cavity wavelength tuning element coupled to a gain medium to produce a tunable laser, or as an intracavity modulator for directly modulated light source, or even as an optically-pumped laser. In a vertical light propagation structure, the cascaded modulation-doped quantum well heterostructures can produce a sufficiently large phase-space absorption quenching (PAQ) effect that the structure can be used for optical reading, optical modulation, optical gating and has applicability to optical interconnects, optical switching, and optical computing.

While it is desirable to operate a device in accordance with the principles of the invention with the light directed along longitudinal axis of the waveguide, it is understood that the semiconductor structure can also operate primarily as an electroabsorption modulator when the light impinges in a direction perpendicular to the semiconductor layers of the device. Such a configuration is shown both in FIG. 2 and FIG. 3.

Figure 2:
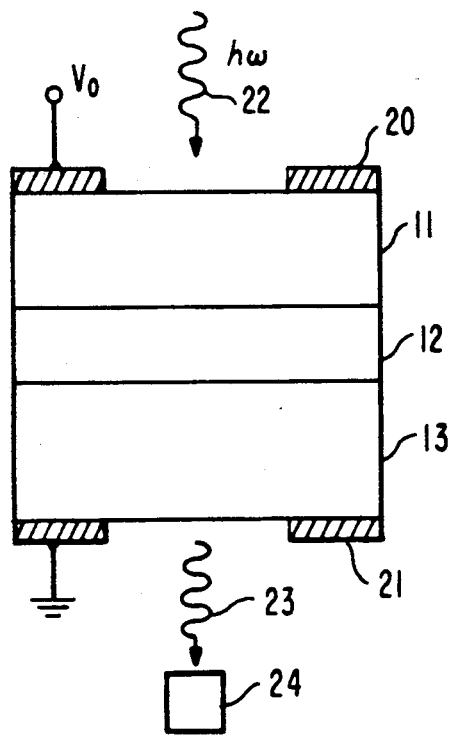
FIGS. 2 and 3 are cross-sectional views of a semiconductor device in accordance with the principles of the invention in which light impinges on the device in a direction perpendicular to the cascaded modulation-doped quantum well heterostructures.

In FIG. 2, optical signal 22 having a mean photon energy $h\omega$ below the energy of the absorption band edge for cladding regions 11 and 13 impinges on a device perpendicular to the semiconductor layers. Modulated optical signal 23 emerges from the semiconductor device for subsequent utilization by element 24. Element 24 may be a lensed optical fiber, or photodetector or the like. In order to permit ingress and egress of optical signals perpendicular to the semiconductor layers, it is desirable to fabricate contacts 20 and 21 as standard annular ring contacts. Since absorption of optical signal 22 is substantially proportionate to the length traversed by the optical signal in the absorbing material, the device shown in FIG. 2 provides a relatively small amount of absorption.

Figure 3:
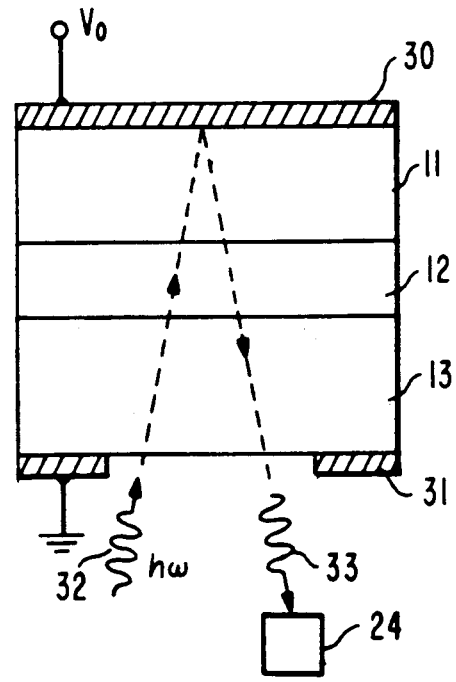

In order to effectively increase the distance over which the optical signals are absorbed, optical signals entering a device perpendicular to the semiconductor layers may be reflected back from an opposite side of the device to traverse the absorbing material for a second time. Such a device is shown in FIG. 3. Optical signal 32 having a mean photon energy $h\omega$ which is in the transparency regions for cladding regions 11 and 13 impinges on a device perpendicular to the semiconductor layers. The once-modulated optical signal is reflected by electrode 30 back through the absorbing material to finally emerge as modulated optical signal 33. In this configuration, contact 30 is realized as a stripe contact while contact 31 is in the form of a standard annular ring contact.

While waveguide embodiments have been shown in FIGS. 1-3, it will become apparent to those skilled in the art that the present invention may be practiced by disposing the cascaded modulation-doped quantum well heterostructures between two doped contact layers. For the example shown in FIGS. 4-8, the contact layers would be doped n-type.

Figure 4:
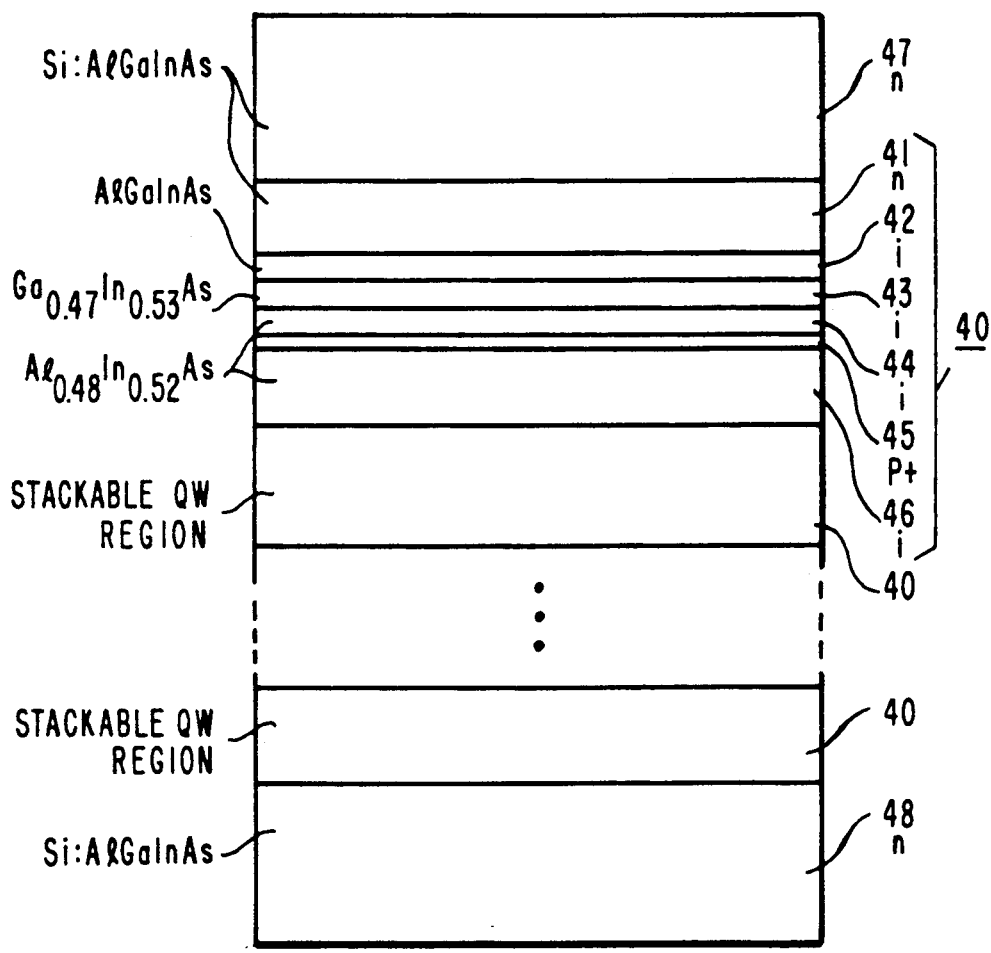
FIG. 4 is a cross-sectional view of semiconductor layers comprising the cascaded modulation-doped quantum well heterostructures.

As shown in FIG. 4, a semiconductor structure suitable for use as a waveguide region 12 in FIGS. 1-3 includes several modulation-doped quantum well heterostructures 40 cascaded or stacked one atop the other and doped buffer layers 47 and 48. At least one buffer layer, namely, layer 48, is provided to complete the periodic n-i-n sequence of the semiconductor structure. Buffer layer 48 comprises AlGaInAs grown to a thickness of approximately 1 $\mu$m and having a doping concentration of Si at approximately $1 \times 10^{18}$ cm$^{-3}$. Modulation-doped quantum well heterostructure 40 is epitaxially grown on layer 48.

Each modulation-doped quantum well heterostructure 40 comprises semiconductor layers grown in according to the following sequence: barrier layer 46 comprising intrinsic $Al_{0.48}In_{0.52}As$ grown to a thickness of 600 Å; p+ doping layer 45 comprising either atomic planar layer doping ($\delta$ doping) or conventional uniform doping of a p-type dopant (Be) to a concentration of approximately $2 \times 10^{12}$ cm$^{-2}$; additional barrier layer 44 comprising intrinsic $Al_{0.48}In_{0.52}As$ grown to a thickness of 100 Å; quantum well 43 comprising narrow bandgap intrinsic material such as $Ga_{0.47}In_{0.53}As$ grown to a thickness of approximately 90 Å; intrinsic spacer layer 42 comprising AlGaInAs grown to a thickness of approximately 100 Å; and reservoir layer 41 comprising AlGaInAs doped within n-type material (Si) to a concentration of approximately $1 \times 10^{18}$ cm$^{-3}$ and grown to a thickness of approximately 600 Å. As shown in the energy band profiles in FIGS. 5 and 7, it is clear that modulation-doped quantum well heterostructure 40 includes semiconductor materials which are properly engineered to have substantially identical boundary conditions at opposite ends of the heterostructure to permit cascading or stacking of one modulation-doped quantum well heterostructure on top of another. In an example of experimental practice, ten modulation-doped quantum well heterostructures were cascaded to form waveguide region 12 of a semiconductor waveguide device.

As described earlier above, doped buffer layer 47 comprising AlGaInAs doped n-type with silicon with a concentration of $1 \times 10^{18}$ cm$^{-3}$ is grown to a thickness of approximately 1 $\mu$m over the uppermost cascaded modulation-doped quantum well heterostructure. Buffer layer 47 also provides a means for transition from the waveguiding region into the cladding region.

With respect to the p-doped layer 45 within modulation-doped quantum well heterostructure 40, it should be noted that a p layer is fully depleted to avoid free carrier absorption due to holes and to provide a potential barrier to electron transport or leakage current from one modulation-doped quantum well heterostructure to the next. As a result, the modulation-doped quantum well heterostructure avoids energy dissipation.

FIGS. 5 and 6 show energy band profiles for a single modulation-doped quantum well heterostructure 40 when the semiconductor device is unbiased and reverse biased, respectively. In FIG. 5, the Fermi level (dashed line 50) is situated below the electron subband $n_z=1$ of the quantum well layer 43. Hence, the quantum well is initially empty. When an external bias is applied to the device, as shown in FIG. 6, a bias across modulation-doped quantum well heterostructure 40 of approximately $-1$ volt, the Fermi level (dashed line 60) rises above the electron subband $n_z=1$ level to cause electrons to fill quantum well layer 43 producing large changes in the optical characteristics of the material. A small amount of current leaks through the potential barrier formed in barrier layers 44 and 46 by p+ doping layer 45. As the electron subband levels fill, the absorption band edge undergoes a "blue shift" thereby quenching absorption of light whose photon energy is less than or equal to the energy of the electron subband $n_z=1$ in quantum well layer 43.

By designing the heterostructure to have a partially full quantum well in the electron subband $n_z=1$, it is possible to induce absorption by application of a bias potential.

Proper engineering of the barrier layers ensures that electrons are the only carriers contributing to the conduction and absorption processes. As a result of the proper barrier design, it is possible to have the associated charge carrier reservoir layers within the modulation-doped quantum well heterostructure be the only source of charge carriers for the quantum well with which it is in close proximity. As the barrier layers are made thinner, it is possible to produce the same effect with a lower applied potential. However, the capacitance of the heterostructure and the leakage current will be increased.

As stated above, the resulting devices are capable of very high speed operation. This results from the fact that charge carriers (electrons) need only be transferred over distances of several hundred angstrom rather than the considerably larger distances in the modulation-doped FET structures of the prior art. An additional benefit of the heterostructure is that is possesses relatively low capacitance. When the modulation-doped quantum well heterostructures are cascaded (stacked) as described above, the capacitance is further reduced because of the series connection between successive heterostructures.

It should be noted that any potential ($V_0$) applied to the device is equally divided across each modulation-doped quantum well heterostructure. As a result, each modulation-doped quantum well heterostructure in a cascaded stack is substantially simultaneously controllable by the electrical bias signal and the corresponding quantum wells are simultaneously depleted or filled. Such simultaneous control is not present in prior multiple quantum well devices without trying to grow a complex, interdigitated electrode structure vertically through the device to connect to separate quantum wells. Because of the size of the quantum wells, this proposal is substantially impractical.

Figure 7:
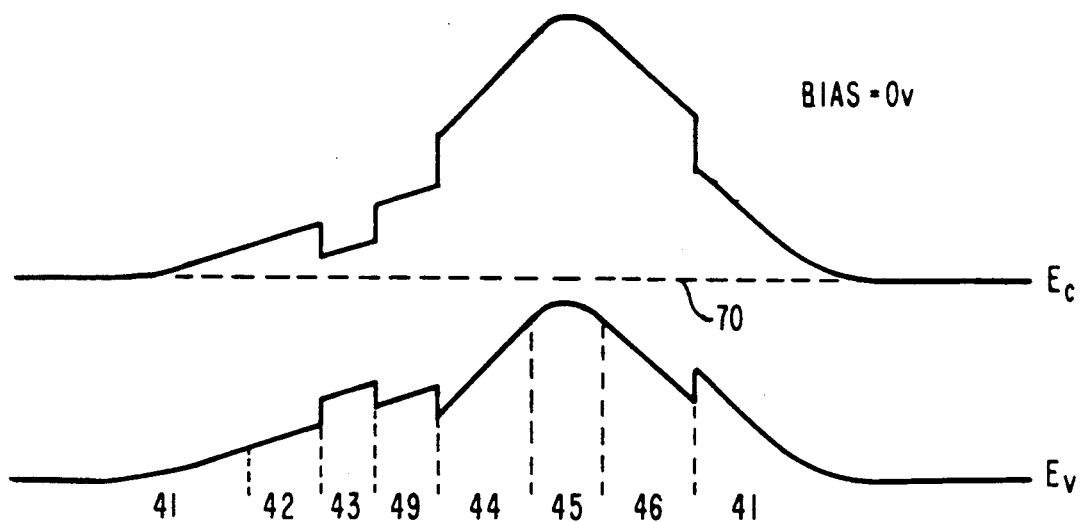
Figure 8:
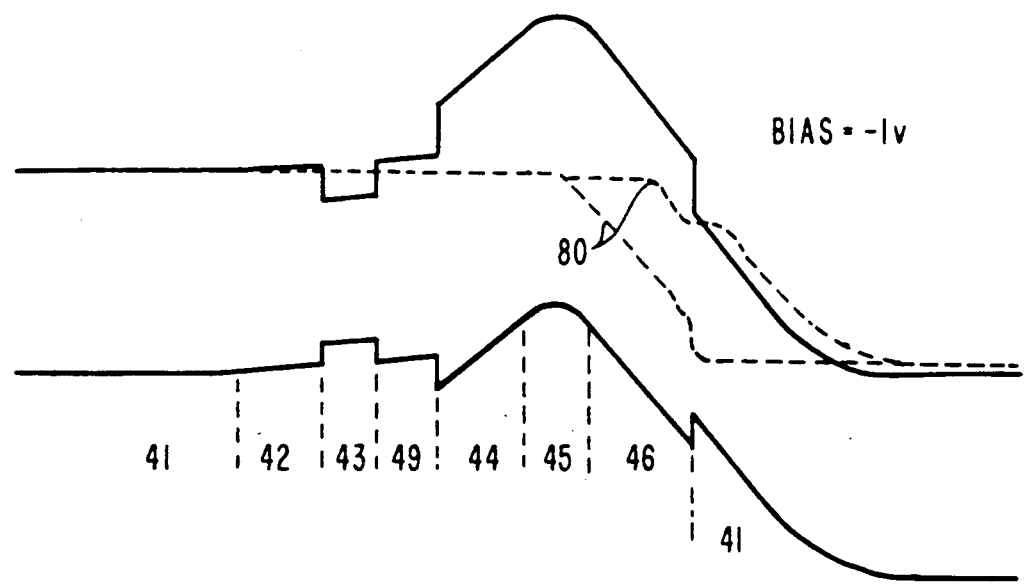

FIGS. 7 and 8 show energy band profiles for a single modulation-doped quantum well heterostructure designed in accordance with the principles of the present invention when subject to different bias potentials. The semiconductor layer structure of the heterostructure is slightly modified over the structure shown in FIG. 4. Quantum well layer 43 has been moved farther away from the formerly adjacent barrier layer so that intrinsic spacer layer 49 is interposed therebetween. By positioning the quantum well layer farther away from the barrier layer, it is possible to adjust the degree of filling experienced by electron subband $n_z=1$ in the quantum well layer both with and without an external biased potential. Additionally, p+ doping layer 45 is shown as a more conventional uniformly doped layer of $Al_{0.48}In_{0.52}As$ rather than as a sheet or atomic planar or $\delta$ doping layer. While the form of the p+ doped layer has changed, it is understood that ionized acceptors within that layer are depleted of p-type carriers (holes).

It is contemplated that a $\delta$ doped n-type layer may be grown at the interface with the barrier layer (interface between layers 43 and 44; interface between layers 49 and 44) to reduce the built in field in the reservoir layer. It is further contemplated that more than one quantum well layer may be included in the vicinity of existing quantum well layer 43. The addition of several quantum well layers increases the optical effects experienced by each modulation-doped quantum well heterostructure while potentially decreasing the speed of operation.

Figure 9:
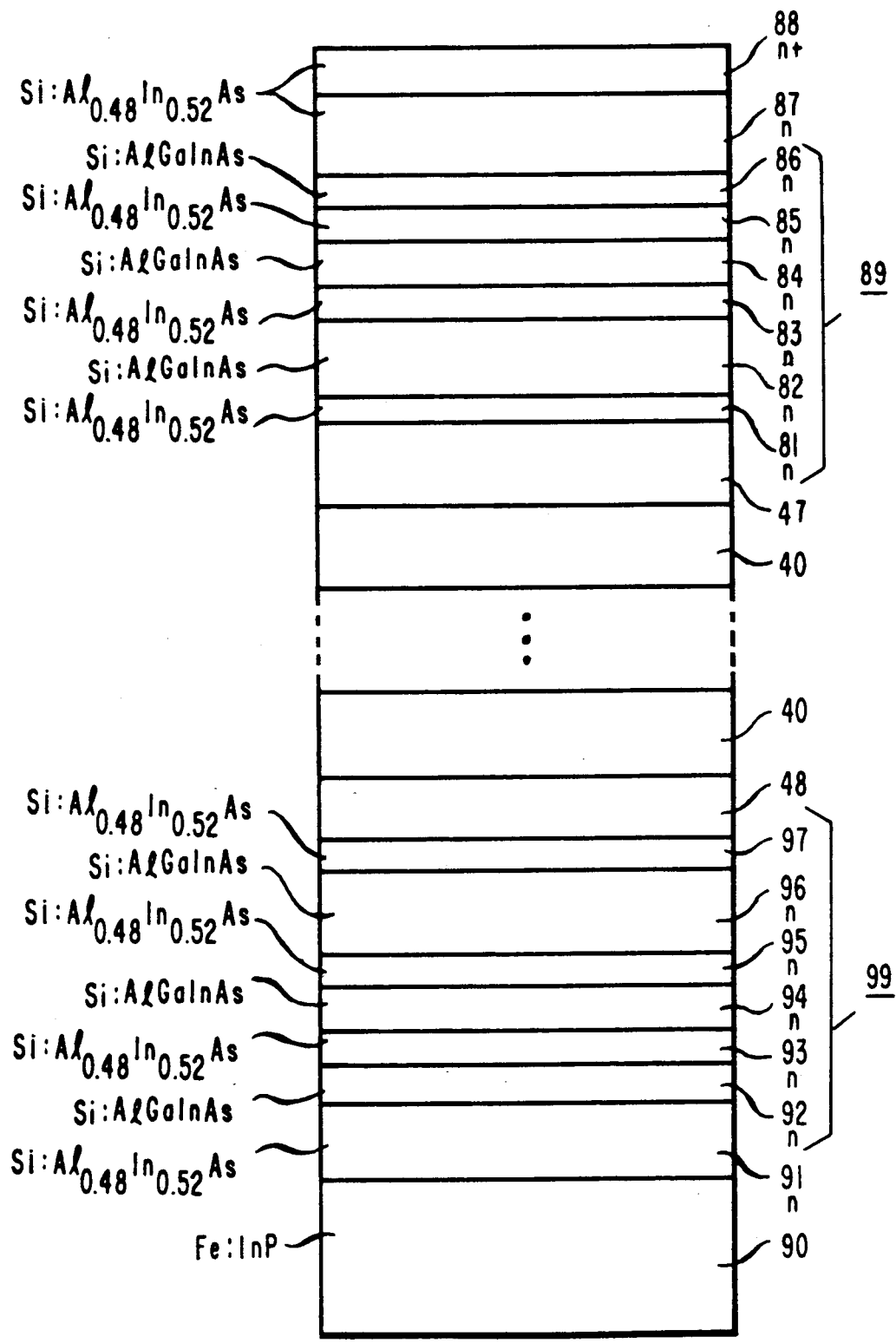
FIG. 9 is a cross-sectional view of semiconductor layers comprising an exemplary waveguide structure similar to that shown in FIG. 1 and including the cascaded modulation-doped quantum well heterostructures.

FIG. 9 has been provided to show an exemplary embodiment of the waveguide structure shown in FIG. 1. The semiconductor structure is grown on substrate 90 comprising semi-insulating Fe doped InP. Cladding layer 91 comprises a 1 μm thick, n-type layer of $Al_{0.48}In_{0.52}As$ doped to a concentration of approximately $2 \times 10^{18}$ cm$^{-3}$ and is grown on substrate 90. Superlattice 99 is grown on layer 91 to provide a gradual transition between the modulation-doped quantum well heterostructures in the waveguide region and the cladding region. Superlattice 99 comprises the following layers which are doped n-type to a concentration of approximately $2 \times 10^{18}$ cm$^{-3}$: AlGaInAs layer 92 (50 Å); $Al_{0.48}In_{0.52}As$ layer 93 (50 Å); AlGaInAs layer 94 (100 Å); $Al_{0.48}In_{0.52}As$ layer 95 (50 Å); AlGaInAs layer 96 (200 Å); and $Al_{0.48}In_{0.52}As$ layer 97 (50 Å). The cascaded modulation-doped quantum well heterostructures together with the associated buffer layers are grown above superlattice 99. Superlattice 89 is then grown with its layers being n-doped to a concentration of $2 \times 10^{18}$ cm$^{-3}$. Superlattice 89 comprises the following layers: $Al_{0.48}In_{0.52}As$ layer 81 (50 Å); AlGaInAs layer 82 (200 Å); $Al_{0.48}In_{0.52}As$ layer 83 (50 Å); AlGaInAs layer 84 (100 Å); $Al_{0.48}In_{0.52}As$ layer 85 (50 Å); and AlGaInAs layer 86 (50 Å). Above superlattice 89 is grown n-type cladding layer 87 comprising $Al_{0.48}In_{0.52}As$ (2 μm) doped with silicon to a concentration of $2 \times 10^{18}$ cm$^{-3}$. Finally, a heavily doped n-type contact layer 88 is grown comprising $Al_{0.48}In_{0.52}As$ (1000 Å) doped with silicon to a concentration of $5 \times 10^{18}$ cm$^{-3}$.

It is contemplated that the cascaded modulation-doped quantum well structure may be interrupted by a separate doped semiconductor layer (which may be contacted) with another cascaded set of modulation-doped quantum well heterostructures following thereon.

Fundamentally, the modulation-doped quantum well heterostructure (n-i-n) is considered a basic semiconductor building block which is simultaneously controllable with other heterostructures in the same cascaded array. The basic building block concept is realized as a charge carrier reservoir in substantially close proximity to at least one quantum well layer wherein the reservoir and quantum well layer are bounded by high barrier layers. Cascadability arises from the further limitation that the heterostructure exhibit substantially equal boundary conditions at each end thereof.

The devices described above may be fabricated by standard epitaxial processing techniques such as molecular beam epitaxy and vapor phase epitaxy such as metal organic chemical vapor deposition. Fabrication techniques including semiconductor layer growth, impurity doping, atomic planar layer or delta impurity doping, photolithography and contact metallization to realize a device in accordance with the principles of the invention described above are believed to be well known to those persons of ordinary skill in the art.

It is understood that, while the material system InGaAs/InGaAlAs is described above for fabricating the electrically controlled semiconductor device having cascaded modulation-doped quantum well semiconductor heterostructures, other material combinations may be selected from other semiconductor Group III–V systems such as GaAs/AlGaAs, InGaAs/InAlAs, GaAs/AlAs, GaAsSb/GaAlAsSb and InGaAsP/InP. In these semiconductor systems, the layers may be lattice-matched to suitable GaAs or InP substrates. Mismatching is also contemplated wherein strained layers are grown over the substrate material. Finally, extension of the device structures is also contemplated to semiconductor compounds in Group II–VI and Group IV.

What is claimed is:

1. A semiconductor device responsive to electrical signals for causing a change to a supplied optical signal comprising at least a first modulation-doped structure including epitaxial regions grown in sequence as follows: a first doped semiconductor region, a quantum well region, said first doped semiconductor region for providing charge carriers to said quantum well region, a barrier region for substantially inhibiting carrier flow from said quantum well region, and a second doped semiconductor region for substantially matching a boundary condition for the conduction and valence bands at an outer end of the second doped semiconductor region to a boundary condition for the conduction and valence bands at an outer end of the first doped semiconductor region, said first and second doped semiconductor layers having substantially similar conductivity types, and said quantum well region having first and second asymmetric barriers wherein the first asymmetric barrier disposed adjacent said first doped semiconductor region has a lower bandgap energy level than the second asymmetric barrier disposed adjacent said second doped semiconductor region, and wherein said barrier region is substantially intrinsic and further includes a third doped semiconductor layer having a conductivity type opposite to the conductivity type of said first and second doped semiconductor regions.

2. The semiconductor device as defined in claim 1 wherein said modulation-doped structure further includes an intrinsic layer epitaxially grown between said first doped semiconductor region and said at least one quantum well region.

3. The semiconductor device as defined in claim 1 wherein said quantum well region includes first and second quantum well layers and a wide bandgap barrier layer separating said first and second quantum well layers.

4. A semiconductor device responsive to electrical signals for causing a change to a supplied optical signal comprising at least first and second modulation-doped structures arranged in cascade wherein each of said first and second modulation-doped structures includes epitaxial regions grown in sequence as follows: a first doped semiconductor region, a quantum well region, said first doped semiconductor region for providing charge carriers to said quantum well region, a barrier region for substantially inhibiting carrier flow from said quantum well region, and a second doped semiconductor region for substantially matching a boundary condition for the conduction and valence bands at an outer end of the second doped semiconductor region to a boundary condition for the conduction and valence bands at an outer end of the first doped semiconductor region, said first and second doped semiconductor layers having substantially similar conductivity types, and said quantum well region having first and second asymmetric barriers wherein the first asymmetric barrier disposed adjacent said first doped semiconductor region has a lower bandgap energy level than the second asymmetric barrier disposed adjacent said second doped semiconductor region.

5. The semiconductor device as defined in claim 4 wherein at least one of said first and second modulation-doped structures further includes an intrinsic layer epitaxially grown between said first doped semiconductor region and said quantum well region.

6. The semiconductor device as defined in claim 5 wherein at least one of said modulation-doped structures further includes a second intrinsic layer epitaxially grown between said barrier region and said quantum well region.

7. The semiconductor device as defined in claim 4 wherein said barrier region is substantially intrinsic and further includes a third doped semiconductor layer having a conductivity type opposite to the conductivity type of said first and second doped semiconductor regions.

8. The semiconductor device as defined in claim 7 wherein said modulation-doped structure further includes an intrinsic layer epitaxially grown between said first doped semiconductor region and said quantum well region.

9. The semiconductor device as defined in claim 4 wherein said quantum well region includes first and second quantum well layers and a wide bandgap barrier layer separating said first and second quantum well layers.

* * * * *